US008055545B2

(12) United States Patent
Mages et al.

(10) Patent No.: US 8,055,545 B2
(45) Date of Patent: Nov. 8, 2011

(54) APPARATUS AND METHOD FOR CONDUCTING SECURE FINANCIAL TRANSACTIONS

(75) Inventors: Kenneth G. Mages, Chicago, IL (US); Chi Wah Lo, Tsuen Wan (HK); Kent H. Mages, Chicago, IL (US); Tai Kwan Tang, Quarry Bay (HK)

(73) Assignee: 4361423 Canada Inc., Montreal, Quebec (CA)

( * ) Notice: Subject to any disclaimer, the term of this patent is extended or adjusted under 35 U.S.C. 154(b) by 356 days.

(21) Appl. No.: 12/230,540

(22) Filed: Aug. 29, 2008

(65) Prior Publication Data
US 2009/0119184 A1 May 7, 2009

Related U.S. Application Data

(60) Provisional application No. 60/969,254, filed on Aug. 31, 2007.

(51) Int. Cl.
*G06Q 40/00* (2006.01)
(52) U.S. Cl. .......................................... 705/26; 705/30
(58) Field of Classification Search ............... 705/10–44
See application file for complete search history.

(56) References Cited

U.S. PATENT DOCUMENTS

| | | | | |
|---|---|---|---|---|
| 5,719,950 | A * | 2/1998 | Osten et al. | 382/115 |
| 6,105,010 | A * | 8/2000 | Musgrave | 705/44 |
| 6,310,966 | B1 * | 10/2001 | Dulude et al. | 382/115 |
| 6,834,270 | B1 * | 12/2004 | Pagani et al. | 705/65 |
| 6,923,371 | B2 * | 8/2005 | Goodfellow | 235/382 |
| 6,985,608 | B2 * | 1/2006 | Hoffman et al. | 382/115 |
| 7,349,871 | B2 * | 3/2008 | Labrou et al. | 705/26.35 |
| 7,584,153 | B2 * | 9/2009 | Brown et al. | 705/75 |
| 7,780,080 | B2 * | 8/2010 | Owen et al. | 235/382 |
| 7,801,826 | B2 * | 9/2010 | Labrou et al. | 705/67 |

* cited by examiner

*Primary Examiner* — Frantzy Poinvil
(74) *Attorney, Agent, or Firm* — Nixon Peabody LLP

(57) ABSTRACT

A system and method are disclosed for conducting secure electronic transactions using dual-authentications. A secure server stores security information for a plurality of users and authorizes transactions being conducted by these users. A user computer system having a trusted platform module is used for storing security information relating to at least one user account. Protected environments are created to facilitate secure connections based on at least the security information stored in the trusted platform module. Transactions between the user/electronic merchants and between the user/secure server are conducted within protected environments. When a user conducts an electronic transaction with an electronic merchant, the transaction is authenticated by the secure server before can be completed.

18 Claims, 3 Drawing Sheets

APPARATUS AND METHOD FOR CONDUCTING SECURE FINANCIAL TRANSACTIONS

CROSS-REFERENCE TO RELATED APPLICATIONS

The present invention claims priority from U.S. Provisional Application Ser. No. 60/969,254, filed Aug. 31, 2007, entitled "Apparatus and Method for Conducting Secure Financial Transactions", which is incorporated herein by reference.

BACKGROUND OF THE INVENTION

1. Technical Field

The present invention relates to electronic transactions and, more particularly, to a system and method for conducting dual-authenticated electronic transactions without the use of a point of sale device.

2. Description of the Related Art

Consumers have become accustomed to conducting electronic transactions using networks such as the Internet. The popularity of electronic transactions has grown such that many consumers purchase more items electronically than in physical store locations. As the popularity of electronic transactions continues to grow, so too has electronic thefts. Hackers have developed numerous techniques to gain access to user account information. Once the account information is obtained, the hacker is able to conduct electronic transactions and charge the costs to the user account.

Various techniques have been developed in an attempt to prevent such theft by hackers. According to at least one conventional technique, users conduct transactions using the encryption provisions of a selected web browser (e.g., Internet Explorer, Firefox, Netscape, etc.). While offering a certain level of security, such techniques are susceptible to flaws in the browser and operating system themselves. These techniques also do not prevent hackers from implanting Trojans, or other malicious programs, in a user's computer to access security information stored on the computer or to intercept such information during electronic transactions.

Dual-factor authentication techniques have been utilized in order to improve security of electronic transactions. A first factor can correspond to something unique or available to a user, such as an automated teller machine (ATM) card, smartcard, etc. The second factor can correspond to something known to, or associated with, the user such as a personal identification number (PIN), fingerprint, retina pattern, etc.

For example, one current methodology attaches a peripheral PIN entry device (PED) using a data connection, such as a USB connection, to a device (e.g., computer, mobile phone, PDA, etc.) capable of accessing a network such as the internet. The PED is used to read information from a magnetic strip of the ATM card using the conventional "swiping" technique. Next, the PIN is entered into the PED, where it is further encrypted by the PED together with information read form the swiped card. The PED subsequently transmits the encrypted information across the network to a location where the transaction will be processed.

While this technique can greatly increase the level of security due to added authentication, it is necessary to incorporate additional hardware such as the PED. The additional costs and complications can often act as a deterrent to conventional users seeking additional security for personal transactions.

Accordingly, there exists a need for increasing the level of security associated electronic transactions.

There also exists a need for conducting dual-authenticated personal transactions without complicated hardware.

SUMMARY OF THE INVENTION

It is therefore one feature and advantage of the present invention to address at least some of the shortcomings of the prior art in conducting secure electronic transactions.

It is another optional feature and advantage of the present invention to increase the level of security associated with electronic transactions using dual-authentication.

It is yet another optional feature and advantage of the present invention to provide a secure platform for conducting dual-authenticated electronic transactions without the need for external hardware.

The foregoing, and various other needs, are addressed, at least in part, by the present invention, wherein a secure server stores security information from a user, and authenticates the user during electronic transactions between the user and another party.

According to one embodiment of the invention, a system is provided for conducting secure transactions. The system includes a secure server, an electronic merchant (and/or financial institution), and a user computer. The secure server stores security information for a plurality of users and authorizes transactions being conducted by these users. The electronic merchant functions as a vendor providing various products and/or services for purchase. The user computer includes a trusted platform module (TPM) for storing/sealing security information relating to at least one user account. The user computer system also includes a virtual appliance module for creating at least one protected environment. The processes running in the protected environment are inaccessible to other process or applications running outside of the protected environment. When a user conducts an electronic transaction with an electronic merchant, the transaction is authenticated by the secure server before can be completed.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DETAILED DESCRIPTION OF THE INVENTION

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The detailed descriptions which follow may be presented in terms of program procedures executed on a computer or network of computers. These procedural descriptions and representations are the means used by those skilled in the art to most effectively convey the substance of their work to others skilled in the art.

The present invention also relates to apparatus for performing these operations. This apparatus may be specially constructed for the required purpose or it may include a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Figure 1:
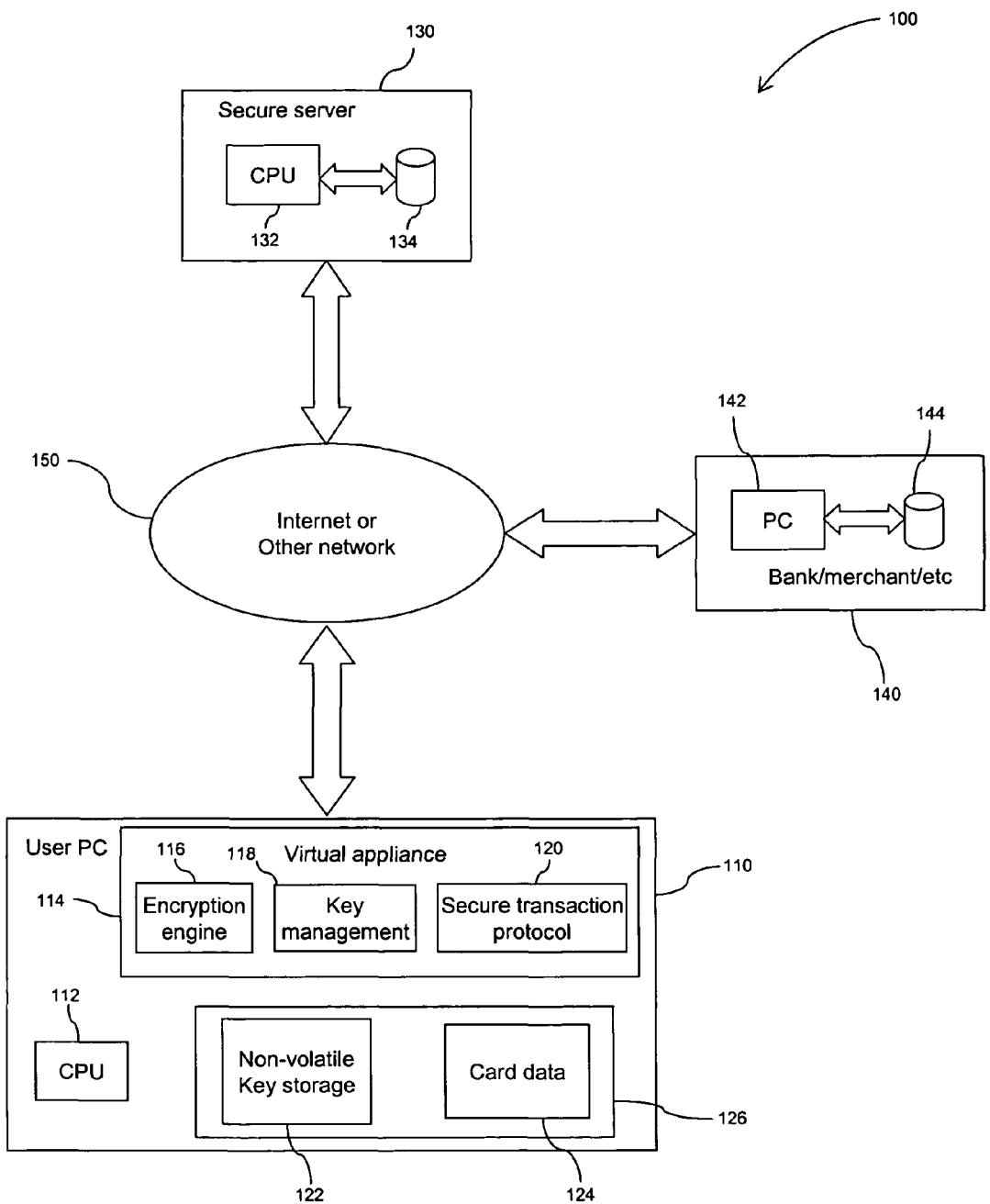
FIG. 1 is a block diagram illustrating an arrangement for conducting secure financial transactions according to an exemplary embodiment of the present invention.

Referring to the drawings, and initially to FIG. 1, a system 100 is shown for conducting financial transactions using, in part, a trusted platform module (TPM). According to the system, at least three different parties are able to interact with each other at different times (or simultaneously) across a network such as the internet 150. The first party is a user who will conduct financial transactions with a financial institution such as a bank 140. According to one or more embodiments of the invention, the user is also able to conduct transactions with merchants (140) or other entities from which a purchase will be made. A secure server 130 is provided to store information for authenticating the user and approve or deny the transactions being made.

The user interacts with a user computer system 110 in order to access the secure server 130 or the bank 140. As used herein, computer system can be any type of equipment that allows the user to access the network 150 and perform various transactions. For example, the computer system 110 can be a conventional desktop computer, a laptop, a terminal, a mobile phone having network access, etc. Further, network communication can be conducted using conventional data communication cables, power transmission lines, wireless transmission devices, mobile communication networks etc.

The user computer system 110 includes appropriate hardware and software for establishing a virtual appliance module 114 that runs on the TPM 126. The virtual appliance module 114 creates a secure program execution space that prevents access from any other processes running on the user computer system 110. The virtual appliance module 114 includes an encryption engine 116 for encrypting information that has been retrieved or stored, a key management system 118 that manages various keys to perform transactions, and a secure transaction protocol 120 that establishes the appropriate security encryption level for data that is received or transmitted by the virtual appliance module 114. According to alternative embodiments of the invention, the encryption engine 116 and the key management system 118 can be incorporated within the TPM 126.

The user computer system 110 also includes a CPU 112 for executing program code and controlling the operation of peripherals and devices connected thereto. According to the present invention, the user computer system 110 includes a TPM 126 that is embedded at the CPU or bios/chipset level in order to prevent tempering and/or manipulation by external programs. The TPM 126 can include, for example, a non-volatile storage area 122 for storing information necessary to conduct secure transactions such as issuer key information. Alternatively, and in addition to such storage, a separate storage 124 area may be provided to store information pertaining to the user's card (e.g., check card, credit card, bank card, etc.).

The user is able to establish a communication link to the bank 140 and/or secure server 130. The bank 140 can include, for example, one or more computer systems 142 (e.g., PC, server, etc.) as well as one or more data storage devices 144 (e.g., tape, magnetic, optical, etc.). Similarly, the secure server 130 can include one or more computer systems 132 as well as data storage devices 134. Further, such storage devices (134, 144) can be internal or external. The secure server 130 and bank 140 can also include distributed computer systems that utilize private communication networks for security.

Figure 2:
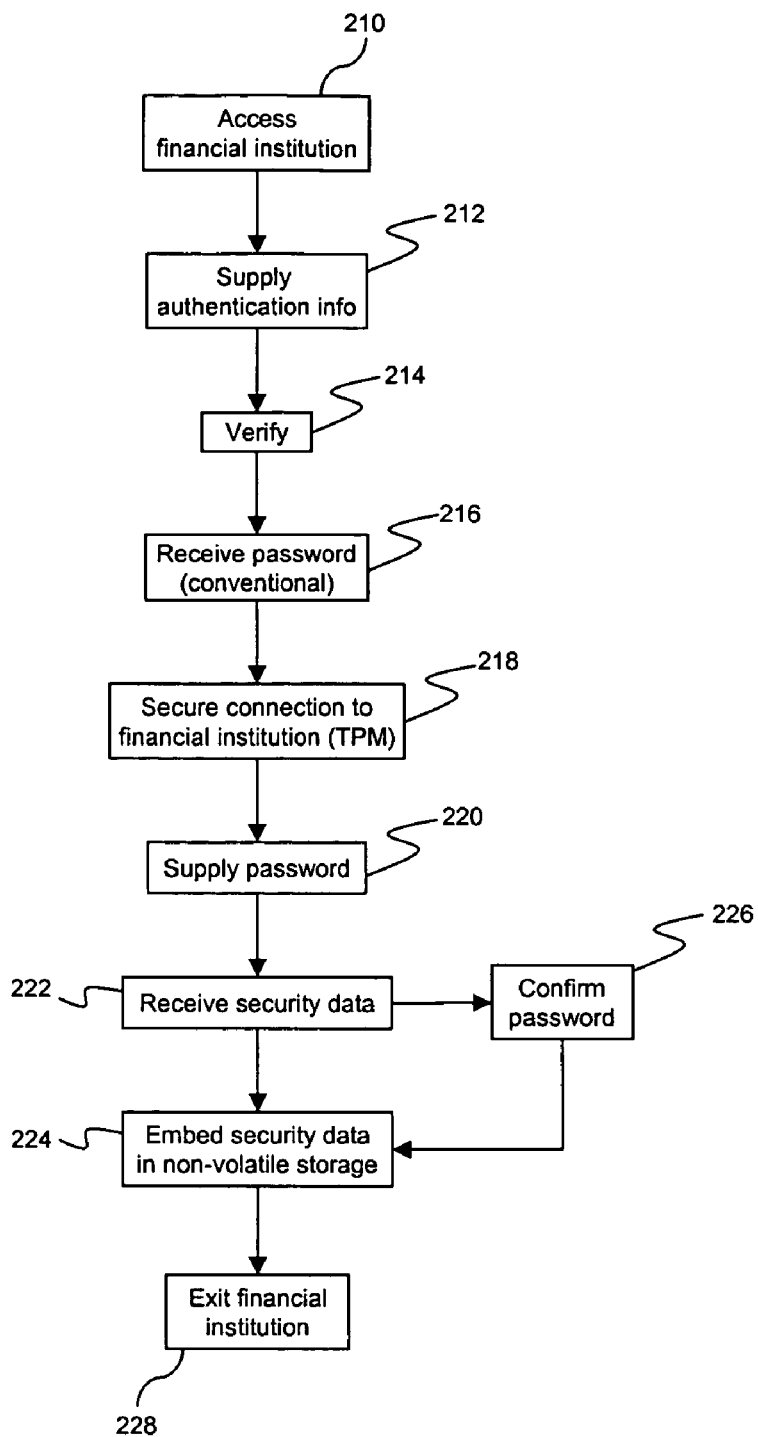
FIG. 2 is a flowchart illustrating the steps performed to register a user's account to support secure financial transactions.

FIG. 2 is a flowchart illustrating the steps performed for registering security data from the bank with the user in order to enable secure transactions, in accordance with at least one embodiment of the present invention. At step S210, the user establishes a communication link with the financial institution over the network.

At step 212, the user is prompted to supply authentication information to confirm his/her identity with the financial institution. The authentication information can include, for example, the user's account number, credit/debit card number, personal information, etc. At step 214, the financial institution verifies the information supplied by the user in order to confirm the user's identity and the account being registered. At step 216, the user receives a password generated by the financial institution. At step 218, the user establishes a secure connection to the financial institution in order to continue the registration process. At step 220, the user is prompted to supply the password that has been generated by the financial institution. At step 226, the financial institution confirms the user's password so that the secure connection can be authenticated.

Once the secure connection is authenticated, a conventional secure channel is established between the user computer system and the financial institution. This secure channel can utilize, for example, encryption technology included in the browser or operating system. At step 222, security data is received from the financial institution. The security data corresponds to specific information that has been generated for the user's registered account. According to one or more embodiments of the invention, the security data can also be supplied in an encrypted form to further reduce the risk of theft. At step 224, the security data is embedded in non-volatile storage, such as memory, disk, TPM, chipset, etc., of the computer system. The data is operated upon during online transactions. Prior to embedding the security data, the user may be prompted to resubmit the password information for confirmation of his/her identity. At step 228, the user terminates the connection with the financial institution.

Figure 3:
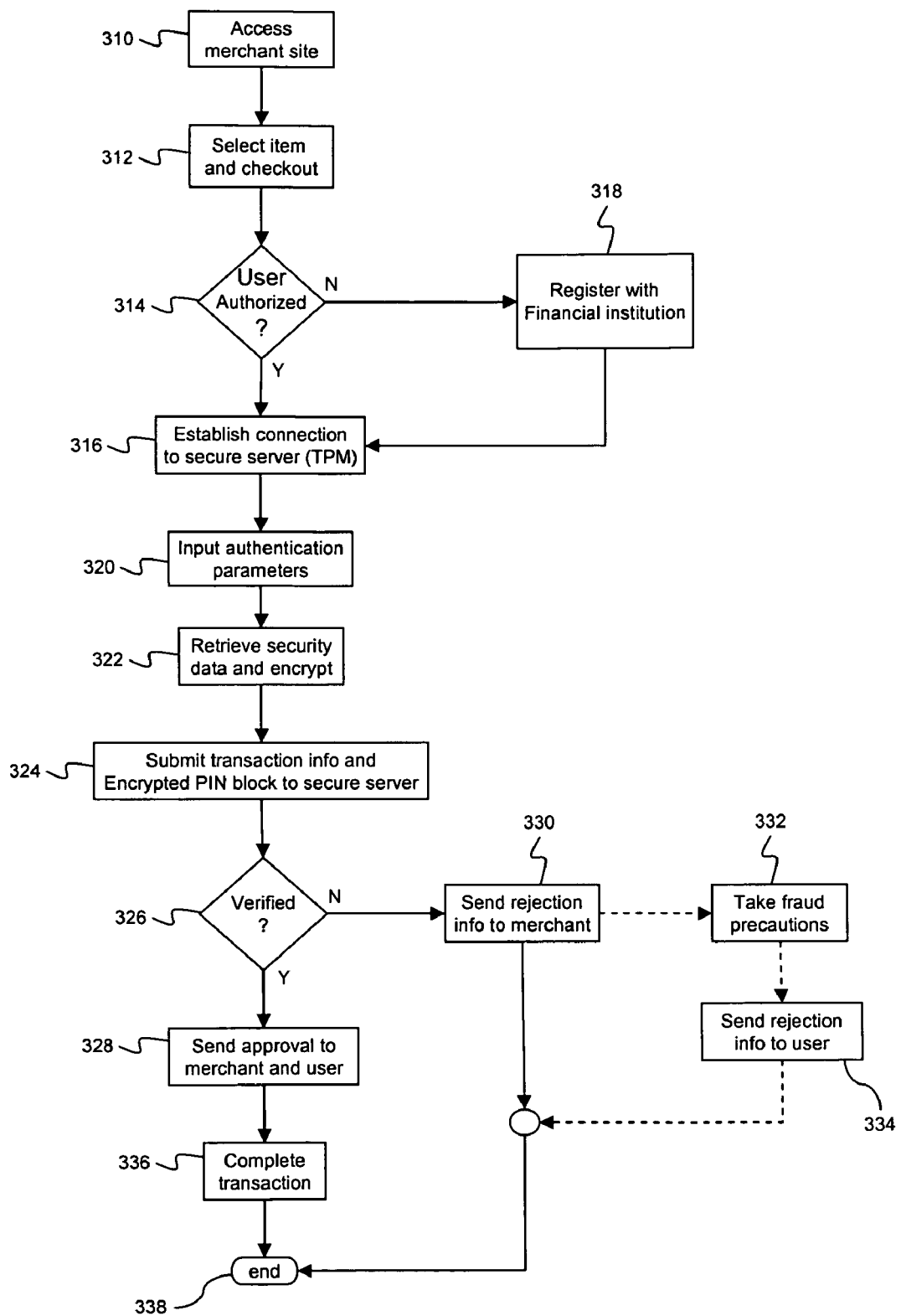
FIG. 3 is a flowchart illustrating the steps performed when conducting a secure financial transaction according to one embodiment of the present invention.

FIG. 3 is a flowchart illustrating the steps performed in conducting a transaction in accordance with at least one embodiment of the claimed invention. At step 310, the user accesses a merchant's website. As previously discussed, this can be done by establishing a connection to the Internet and browsing to an address registered to the merchant. The user is then able to review various products and/or services offered by the merchant. At step 312, the user selects an item for purchase and proceeds to the electronic checkout where payment will be submitted. At step 314, it is determined if the user is authorized to perform secure transactions using the TPM. If the user is authorized, then control passes to step 316. Otherwise, control passes to step 318 where the user is required to register with a financial institution. As previously discussed, such a registration process involves creation of security information for at least one user account. The security information is subsequently embedded in non-volatile memory of the computer. Once the user has registered with the financial institution, control passes to step 316 where the user establishes a connection to the secure server 130. At step 320, the user is prompted to provide authentication information such as a PIN, fingerprint, etc. As can be appreciated, the virtual appliance module with protected graphics is running in the user computer during this process. Accordingly, information displayed within graphics frame buffer is protected from access or compromise by unauthorized software. The authentication information is therefore securely input by the user.

At step 322, the virtual appliance module executes an encryption routine to encrypt the security data such as cardholder data, retrieved from a secured storage, and the PIN or other authentication parameters, obtained from secured input, to form an encrypted PIN block or a cryptogram that is necessary in a transaction. The encryption is done either within the processor (e.g. the CPU) in the trusted environment or inside the secure hardware unit (e.g. TPM).

At step 324, the virtual appliance module supplies the transaction information and the encrypted PIN block to the secure server 130. The transaction information can include, for example, the merchant name, item name, item number, price, billing address, etc. According to one or more embodiments of the present invention, the transaction information can include a confirmation number that has been generated by the merchant.

At step 326, the transaction information is verified by the secure server 130, based at least in part, on the password supplied by the user and security data retrieved from the user computer system. If the secure server 130 cannot verify the transaction, a rejection is transmitted to the merchant at step 330. For example, if the security data retrieved from the user PC does not match the information stored in the secure server's database, the transaction would not be verified. As another example, if the password supplied by the user cannot be confirmed, the transaction would not be verified. According to one or more embodiments of the invention, the merchant can optionally take appropriate precautions to address such situations. At step 332, the merchant can initiate appropriate fraud precautions based on internal rules and procedures. At step 334, the rejection information would be supplied to the user together with, for example, an indication that possible fraud activities may be in progress.

If the secure server 130 verifies the transaction information, then approval is sent to the merchant at step 328. The merchant is then free to complete the transaction with the user at step 336. Depending on the type of network being used, the user may be allowed to maintain a continuous communication link with both the secure server 130 and merchant. The transaction process subsequently ends at step 338.

As can be appreciated, the present invention substitutes import of data representative of information in the magnetic stripe of an ATM card from the user's bank account using a secure bidirectional connection for the peripheral PIN entry device. Once the secure data is transferred from the bank to the user's web connected device the data can be embedded therein.

The present invention can be embodied in a client-server model. In such an arrangement, the device is the client and a website where the secure transaction is to occur acts as the server. In order to initiate a secure transaction, an online session is established where the server recognizes communication with a secure web connected device, identifies the secure data, and requests the user to provide a PIN. This fulfills the requirements of two-factor authentication in that the first factor of something available to the user is in the form of data secured from the bank in the web connected device thus replacing the need to swipe the users ATM card because the data is now embedded securely in the invention. To complete the second requirement in the two-factor authentication process, the user enters a PIN which is encrypted and transmitted by the web connected device to the server.

The present invention advantageously substitutes then need for a tamper resistant peripheral by utilizing tamper resistance in a self-contained module within the Web connected device, and with secured input and output allowing for the securing of bank sensitive data and the entry of a PIN to complete a two-factor authentication without a peripheral.

According to various embodiments of the invention, a system for creating a secure transaction platform would include a user computer system with a hardware unit for providing a trusted computing environment, sealing of cardholder data and other security information. The hardware unit can be a part of a secure processor, a co-processor, part of a chipset or a secure module such as a TPM. An OS Kernel or processor routine can be used to manage the resources dedicated to the trusted computing environment. A transaction payment application software can be used to perform online transactions. The application can either run as a virtual machine, a standalone application, or within other agents such as a web browser. The system can also include an online merchant/financial institute for providing a plurality of products and/or services for purchase and/or all other kind of transactions including balance inquiry, deposit, transfer, etc. A secure server can subsequently authorize transactions initiated by the plurality of users. The secure server can approve or reject a transaction based on the cardholder data and PIN or other authentication parameters provided.

According to other embodiments, a transaction payment software running on a trusted computing environment can be used to provide:

(1) A protected execution environment where no other unauthorized software can access or compromise the information being operated upon. The trusted execution environment ensures the integrity and confidentiality transaction payment software, making it free from attack from other malicious programs.

(2) A secure network connection mechanism, e.g. trusted network connect (TNC), for mutual authentication of client and server. The secure network connection provides a safe communication channel between the customer and bank/merchant in an online transaction. The bank/merchant knows that it is talking to its intended customer and the customer knows that he is going to the intended, genuine web site but not some phishing sites.

(3) Protected input channels where input such as keystrokes and mouse clicks are encrypted and thus protected from access or compromise by unauthorized software; and (4) Protected graphics where information display within graphics frame buffer are protected from access or compromise by unauthorized software. With protected input and output, a user enters a PIN or inputs other authentication parameters such as fingerprints, etc., free from keyloggers, screen capture programs or other malicious software.

The present invention is also capable of providing a methodology for storing cardholder data and other secure and sensitive information in a user computer. The data is encrypted and stored in non-volatile storage media (memory, disk, etc.) and operated upon during an online transaction. The actual physical storage of the data can either be inside or outside of the secure processor or TPM. Furthermore, security data such as cardholder data, retrieved from a secured storage, and the PIN or other authentication parameters, obtained from secured input, are encrypted to form a encrypted pin block or a cryptogram that are necessary in a transaction. The encryption is done either within the processor (e.g. the CPU) in the trusted environment or inside the secure hardware unit (e.g. TPM).

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for effecting a secure financial transaction with trusted computing technology, comprising:
    a commercial computer system for creating and maintaining accounts for a plurality of users; and
    a user computer system including:
        a data storage device for storing a computer program code thereon;
        a processor that executes said stored computer program code to implement the following components:
            a trusted platform module embedded in said user computer system for storing security information relating to the user and at least one account associated with the commercial computer system, and
            a virtual appliance module for creating at least one protected environment for establishing a secure connection with an external computer system based on at least the security information stored in the trusted platform module;
    wherein the commercial computer system creates at least a portion of the security information stored in or sealed by the trusted platform module; and
    wherein the protected environment is inaccessible to applications running outside of the protected environment.

2. The system of claim 1 comprising a secure server that includes a data storage device for storing security information for a plurality of users, a processor for authorizing transactions initiated by the plurality of users, for communicating with said commercial computer system and said user computer system and for establishing a trusted communication path between with said user computer system.

3. The system of claim 2 in which said secure server includes a trusted platform module.

4. The system of claim 2 in which said processor of said secure server determines whether transaction information from said user computer system can be verified, based on information stored in the secure server, and, if said transaction information is verified by the secure server, transmitting approval for the transaction to both said commercial computer system and said user computer system.

5. The system of claim 4 in which said commercial computer system is a computer system of a merchant.

6. The system of claim 1 in which said commercial computer system includes a trusted platform module.

7. The system of claim 1 in which said virtual appliance module includes an encryption engine for encrypting information that has been retrieved or stored.

8. The system of claim 1 in which said virtual appliance module includes a key management system that manages at least one key to perform said secure financial transaction.

9. The system of claim 1 in which said trusted platform module includes non-volatile storage for storing information for conducting secure transactions.

10. The system of claim 1 in which said trusted platform module includes storage for storing information pertaining to a financial card of said user.

11. The system of claim 1 in which said virtual appliance module is protected from access by unauthorized software.

12. A system for conducting secure financial transactions with trusted computing technology, comprising:
    a secure server for storing security information for a plurality of users and authorizing transactions initiated by the plurality of users;
    an electronic merchant providing a plurality of products and/or services for purchase; and
    a user computer system including:
    a data storage storing a computer program code thereon;
        a processor that executes said computer program to implement the following components:
            a trusted platform module embedded in said user computer system for storing security information relating to the user and at least one user account, wherein the security information stored in the trusted platform module is the same security information stored in the secure server, and
            a virtual appliance module for creating at least one protected environment for establishing a secure connection based on at least the security information stored in the trusted platform module, wherein the protected environment is inaccessible to applications running outside of the protected environment;
    wherein transactions between the user computer system and the electronic merchant are authenticated by the secure server.

13. The system of claim 12 which includes a commercial computer system for creating and maintaining accounts for a plurality of users.

14. The system of claim 12 in which said virtual appliance module is part of said trusted platform module.

15. A method of effecting a secure financial transaction between a buyer and a seller via a communication network coupled to a buyer computer and a seller computer using trusted computing technology, said method comprising
    establishing a trusted network connection between the computers of the buyer and seller,
    determining whether the buyer is authorized to perform secure transactions, based on information obtained by the seller computer from the buyer computer,
    if the buyer is determined to be authorized, establishing a trusted communication path between a secure server and both the seller computer and the buyer computer,
    transmitting transaction information to the secure server, wherein said transaction information includes secure buyer authentication information stored on a virtual appliance module in the buyer computer, determining, in the secure server, whether the transaction information can be verified, based on information stored in the secure server, and if the transaction information is verified in the secure server, transmitting approval for the transaction to both the seller computer and the buyer computer.

16. The method of claim 15 in which a financial institution verifies said secure buyer authentication information.

17. The method of claim 15 in which said buyer establishes a secure connection to a financial institution and supplies a password, and said financial institution determines whether said password is valid and, if it is, authenticates said secure connection.

18. The method of claim 15 in which said buyer authentication information includes biometric information identifying said buyer.

* * * * *